United States Patent
Song et al.

(10) Patent No.: US 9,049,441 B2
(45) Date of Patent: Jun. 2, 2015

(54) 3D IMAGE DISPLAY APPARATUS AND METHOD

(75) Inventors: Hoon Song, Yongin-si (KR);
Yong-kweun Mun, Yongin-si (KR);
Yoon-sun Choi, Yongin-si (KR);
Hong-seok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 13/215,163

(22) Filed: Aug. 22, 2011

(65) Prior Publication Data
US 2012/0056879 A1 Mar. 8, 2012

(30) Foreign Application Priority Data

Sep. 7, 2010 (KR) .................... 10-2010-0087668

(51) Int. Cl.
*G06T 15/00* (2011.01)
*H04N 13/04* (2006.01)

(52) U.S. Cl.
CPC ....... *H04N 13/0456* (2013.01); *H04N 13/0404* (2013.01); *H04N 13/0409* (2013.01); *H04N 13/0418* (2013.01)

(58) Field of Classification Search
CPC ........................................... G06T 15/00
USPC ......................................... 345/419
See application file for complete search history.

(56) References Cited

U.S. PATENT DOCUMENTS

| 5,761,314 | A | * | 6/1998 | Inanaga et al. .................. 381/17 |
| 5,796,843 | A | * | 8/1998 | Inanaga et al. .................. 381/17 |
| 5,822,117 | A | * | 10/1998 | Kleinberger et al. ......... 359/465 |
| 5,973,831 | A | * | 10/1999 | Kleinberger et al. ......... 359/465 |
| 6,014,164 | A | * | 1/2000 | Woodgate et al. .............. 348/51 |
| 6,023,277 | A | * | 2/2000 | Osaka et al. .................. 345/419 |
| 7,084,841 | B2 | | 8/2006 | Balogh |
| 7,327,410 | B2 | * | 2/2008 | Cho et al. ........................ 349/15 |
| 7,420,549 | B2 | * | 9/2008 | Jacobson et al. ............. 345/204 |
| 7,884,823 | B2 | * | 2/2011 | Bertolami et al. ............ 345/427 |
| 8,395,616 | B2 | * | 3/2013 | Schwerdtner ................ 345/419 |
| 8,456,514 | B2 | * | 6/2013 | Leister ............................ 348/40 |
| 2001/0013971 | A1 | * | 8/2001 | Kleinberger et al. ......... 359/465 |
| 2002/0101506 | A1 | * | 8/2002 | Suzuki ........................... 348/51 |
| 2002/0146201 | A1 | * | 10/2002 | Suzuki et al. .................. 385/19 |
| 2004/0056948 | A1 | * | 3/2004 | Gibson ........................... 348/56 |
| 2005/0057702 | A1 | * | 3/2005 | Cho et al. ........................ 349/15 |
| 2005/0151709 | A1 | * | 7/2005 | Jacobson et al. ................ 345/84 |

(Continued)

FOREIGN PATENT DOCUMENTS

| JP | 08-211334 | 8/1996 |
| JP | 2001-281459 | 10/2011 |

(Continued)

*Primary Examiner* — Dave Czekaj
*Assistant Examiner* — Kehinde O Abimbola
(74) *Attorney, Agent, or Firm* — NSIP Law

(57) ABSTRACT

A 3D image display apparatus and a 3D image display method are provided. The 3D image display apparatus generates a 2D image region and a 3D image region, forms shutter patterns for the 3D and 2D image regions, and adjusts a light emitting direction according to the shutter patterns. Accordingly, the 2D and 3D images may be selectively displayed on one screen.

27 Claims, 14 Drawing Sheets

(56) References Cited

U.S. PATENT DOCUMENTS

| | | | |
|---|---|---|---|
| 2006/0164840 A1* | 7/2006 | Song et al. | 362/341 |
| 2006/0279567 A1* | 12/2006 | Schwerdtner et al. | 345/419 |
| 2007/0103459 A1* | 5/2007 | Stoval et al. | 345/419 |
| 2007/0247590 A1* | 10/2007 | Schwerdtner | 353/7 |
| 2008/0309660 A1* | 12/2008 | Bertolami et al. | 345/419 |
| 2009/0160854 A1* | 6/2009 | Stoval et al. | 345/419 |
| 2009/0207345 A1* | 8/2009 | Song et al. | 349/67 |
| 2009/0315981 A1* | 12/2009 | Jung et al. | 348/43 |
| 2010/0289870 A1* | 11/2010 | Leister | 348/40 |

FOREIGN PATENT DOCUMENTS

| | | |
|---|---|---|
| KR | 102007006553 | 1/2007 |
| KR | 1020070011291 | 1/2007 |
| KR | 1020070015686 | 2/2007 |
| KR | 1020070043147 | 4/2007 |
| KR | 1020080003073 | 1/2008 |
| KR | 1020080048782 | 6/2008 |
| KR | 1020090004594 | 1/2009 |
| KR | 1020090031884 | 3/2009 |

* cited by examiner

2D IMAGE REGION

3D IMAGE REGION

2D IMAGE REGION

3D IMAGE REGION

3D IMAGE DISPLAY APPARATUS AND METHOD

CROSS-REFERENCE TO RELATED APPLICATIONS

This application claims the benefit under 35 U.S.C. §119(a) of Korean Patent Application No. 10-2010-0087668, filed on Sep. 7, 2010, in the Korean Intellectual Property Office, the disclosure of which is incorporated herein in its entirety by reference for all purposes.

BACKGROUND

1. Field

The following description relates to three-dimensional (3D) image display apparatuses and methods for selectively displaying a two-dimensional (2D) image and a 3D image.

2. Description of the Related Art

A three-dimensional (3D) image is observed according to the principle of stereoscopic vision, in which a person views an object with both eyes at the same time. Binocular parallax, a characteristic due to the positions of the left eye and right eye located about 65 mm apart from each other, is the most important factor producing a 3D image. Two categories of 3D image displays include displays using glasses and displays that do not use glasses. The latter generates 3D images by dividing images for left and right eyes without using glasses. Types of displays that do not use glasses include parallax barrier-type displays and lenticular-type displays.

A parallax barrier-type display alternately displays images to be seen respectively by the left and right eyes in the form of a vertical pattern or a photo using an extremely thin vertical lattice column, i.e., a barrier. By doing so, a vertical pattern image that is to be provided to the left eye and a vertical pattern image that is to be provided to the right eye are separated by the barrier and images from different viewpoints are seen by the left and the right eyes, respectively, so that a stereoscopic image is perceived.

The lenticular-type display arranges images corresponding to the left and right eyes on a focusing surface of a lenticular lens. When a user observes the images through the lenticular lens, the divided images are incident on the left and right eyes according to a directivity feature of the lens, so that a stereoscopic image is perceived.

According to both the parallax barrier-type display and the lenticular-type display, a period, a focal length, and a direction of the barrier or lens are fixed, and thus, locations at which 3D images may be observed are fixed. For example, the direction in which 3D images are observed is set according to the arrangement direction of the lenticular lens or the barrier, and thus, the 3D images may be seen in only one of a transverse mode and a longitudinal mode. However, various selections may be desired, for example, selection of a viewing direction or selection of 2D or 3D, due to the development of 3D image display devices.

SUMMARY

Described herein are 3D image display apparatuses for selectively displaying a 2D image and a 3D image on the same screen.

Also described herein are 3D image display methods for displaying a 3D image by adjusting a light emitting direction.

According to one general aspect, there is provided a three-dimensional (3D) image display apparatus including an input unit to generate a 3D image region and a two-dimensional (2D) image region, a mask pattern forming unit to form a mask pattern corresponding to the 3D image region generated by the input unit, a shutter pattern forming unit to form a first shutter pattern for a first eye and a second shutter pattern for a second eye, according to the mask pattern, a backlight unit including a plurality of cells and a light emission unit to adjust a light emitting direction in each of the plurality of cells, a controller adjust the light emitting direction from the light emission unit according to the first and second shutter patterns, and a display panel to display images according to the light emitted from the backlight unit.

The input unit may include a coordinate generator for generating coordinates of the 3D image region.

The light emission unit may include a plurality of reflection units arranged in a two-dimensional manner along a curved surface, each of the plurality of reflection units having a curved portion, and a plurality of light sources, each of the plurality of light sources corresponding to one of the plurality of reflection units.

Each of the plurality of reflection units may reflect the light emitted from each of the plurality of corresponding light sources as collimated light.

Each of the plurality of light sources may be independently controlled.

The light emission unit may include a plurality of light sources; a light guide plate to guide light emitted from the plurality of light sources, and a prism array disposed on the light guide plate to adjust an inclination of a refracting surface according to an electric signal, wherein the prism array is partitioned with respect to the plurality of cells.

The light guide plate may be formed as a wedge.

The prism array may include an electrowetting device.

The prism array may be arranged in a two-dimensional manner.

The light emission unit may include a light array to selectively switch a light source, and a direction adjustor to limit a proceeding direction of light emitted from the light array.

The light emission unit may include a plurality of light sources, a light guide plate to guide light emitted from the plurality of light sources, a shutter array disposed on the light guide plate, including a plurality of shutters, each of the plurality of shutters independently controllable to open and close, and a lens array disposed on the shutter array.

The shutter array may include at least one selected from the group of a liquid crystal shutter, an electrowetting shutter, a frustrated total internal reflection (FTIR) shutter, and any combination thereof.

The shutter array may be arranged in a two-dimensional manner.

A light emitting angle may be adjusted by adjusting light transmittances of the plurality of shutters in each of the cells.

The light transmittances of the plurality of shutters may be adjusted by controlling at least one selected from the group of polarization, a transmitting area per unit area of the shutter, a transmitting time per unit time, and any combination thereof.

The light emission unit may include a light source array disposed on each of the cells, including a plurality of light sources that are independently controllable to turn on and turn off, and a pin hole array disposed on each of the cells to limit a proceeding direction of light emitted from each of the plurality of light sources.

The first shutter pattern may include a pattern for a 2D image and a pattern for a left eye image, and the second shutter pattern may include a pattern for a 2D image and a pattern for a right eye image.

According to another general, there is provided a 3D image display method including generating a 2D image region and a 3D image region, forming a mask pattern corresponding to the 3D image region, forming a first shutter pattern for a first eye according to the mask pattern, forming a second shutter pattern for a second eye according to the mask pattern, adjusting a light emitting direction from each of a plurality of cells of a backlight unit, according to the first shutter pattern and the second shutter pattern, and emitting light in the adjusted light emitting direction of each of the plurality of cells.

The first shutter pattern may include a pattern for a 2D image and a pattern for a left eye image, and the second shutter pattern may include a pattern for a 2D image and a pattern for a right eye image.

The backlight unit may include the plurality of cells and a light emission unit, and the light emission unit may include a plurality of light sources, a light guide plate to guide light emitted from the plurality of light sources, a shutter array disposed on the light guide plate, including a plurality of shutters, each of the plurality of shutters independently controllable to open and close, and a lens array disposed on the shutter array.

The shutter array may include at least one selected from the group of a liquid crystal shutter, an electrowetting shutter, a frustrated total internal reflection (FTIR) shutter, and any combination thereof.

A light emitting angle may be adjusted by adjusting light transmittances of the plurality of shutters in each of the cells.

The light transmittances of the plurality of shutters may be adjusted by controlling at least one selected from the group of polarization, a transmitting area per unit area of the shutter, transmitting time per unit time, and any combination thereof.

In yet another general aspect, there is provided a method of displaying images on a screen, including receiving 2D image information and 3D image information, determining a 2D image region of the screen according to the 2D image information, determining a 3D image region of the screen according to the 3D image information, forming a mask pattern according to the 3D image region, generating a first shutter pattern for a first eye according to the mask pattern, generating a second shutter pattern for a second eye according to the mask pattern, displaying a 2D image in the 2D image region of the screen, according to the 2D image information and the first and second shutter patterns, and displaying a 3D image in the 3D image region of the screen, according to the 3D image information and the first and second shutter patterns.

The first shutter pattern may include a pattern for the 2D image and a pattern for a left eye image of the 3D image, and the second shutter pattern may include a pattern for the 2D image and a pattern for a right eye image of the 3D image.

The determining of the 3D image region may include generating coordinates of the 3D image region.

Other features and aspects may be apparent from the following detailed description, the drawings, and the claims.

Figure 1:
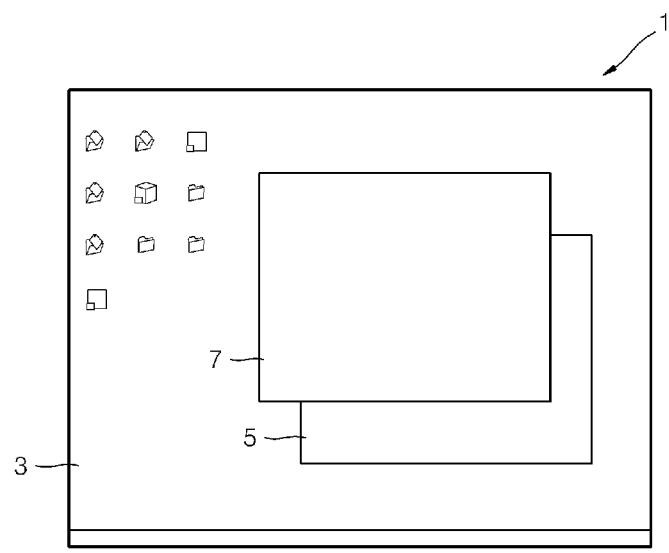
FIG. 1 is a schematic diagram illustrating an example of a 3D image display apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Referring to FIG. 1, as one example, a three-dimensional (3D) image display apparatus 1 may include two-dimensional (2D) image regions 3 and 5 and a 3D image region 7. As illustrated, each of these regions may be included on one screen. For example, when a plurality of regions are displayed as windows on a computer monitor, some of the plurality of regions may include 3D image contents, and others of the plurality of regions may include 2D image contents. As an example, the 3D image contents may include movies, and the 2D image contents may include documents. Here, when each of the plurality of regions is all displayed as a 2D image or a 3D image, a given region may be displayed in a mode that is not suitable for the corresponding contents. For example, when each of the plurality of regions on the screen is displayed as a 3D image, readability of the 2D image contents, such as characters or symbols, may be degraded. On the other hand, when each of the plurality of regions on the screen is displayed as a 2D image, a depth of the 3D image contents may not be represented. Accordingly, the 3D image display apparatus as described in the examples herein may display 2D images in the 2D image regions and 3D images in the 3D image regions on one screen, while substantially maintaining display quality of both 3D images and 2D images.

Figure 2:
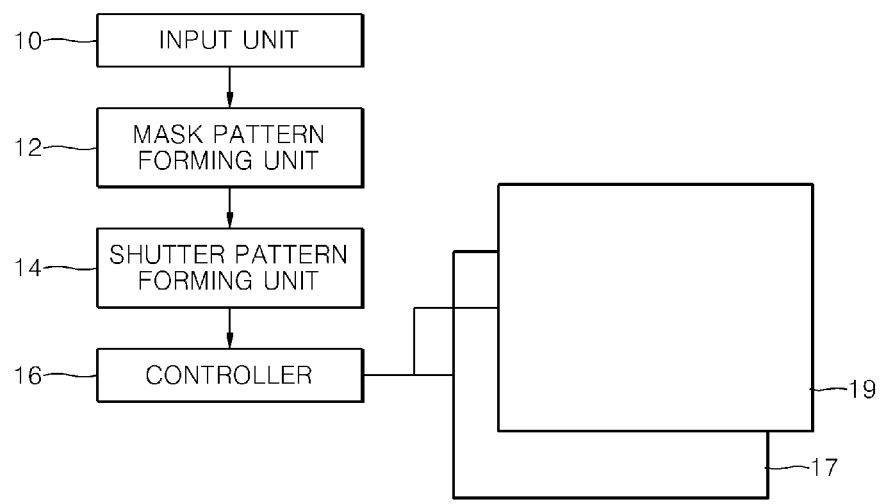
FIG. 2 is a block diagram illustrating an example of the 3D image display apparatus of FIG. 1.

FIG. 2 illustrates an example of a schematic block diagram of a 3D image display apparatus. The 3D image display apparatus includes an input unit 10 for generating 3D image regions and 2D image regions, a mask pattern forming unit 12 for forming mask patterns corresponding to the 3D image regions input from the input unit 10, and a shutter pattern forming unit 14 for forming a first shutter pattern and a second shutter pattern according to the mask patterns. The input unit 10 may include a coordinate generator for generating coordinates of the 3D image regions.

Figure 3:
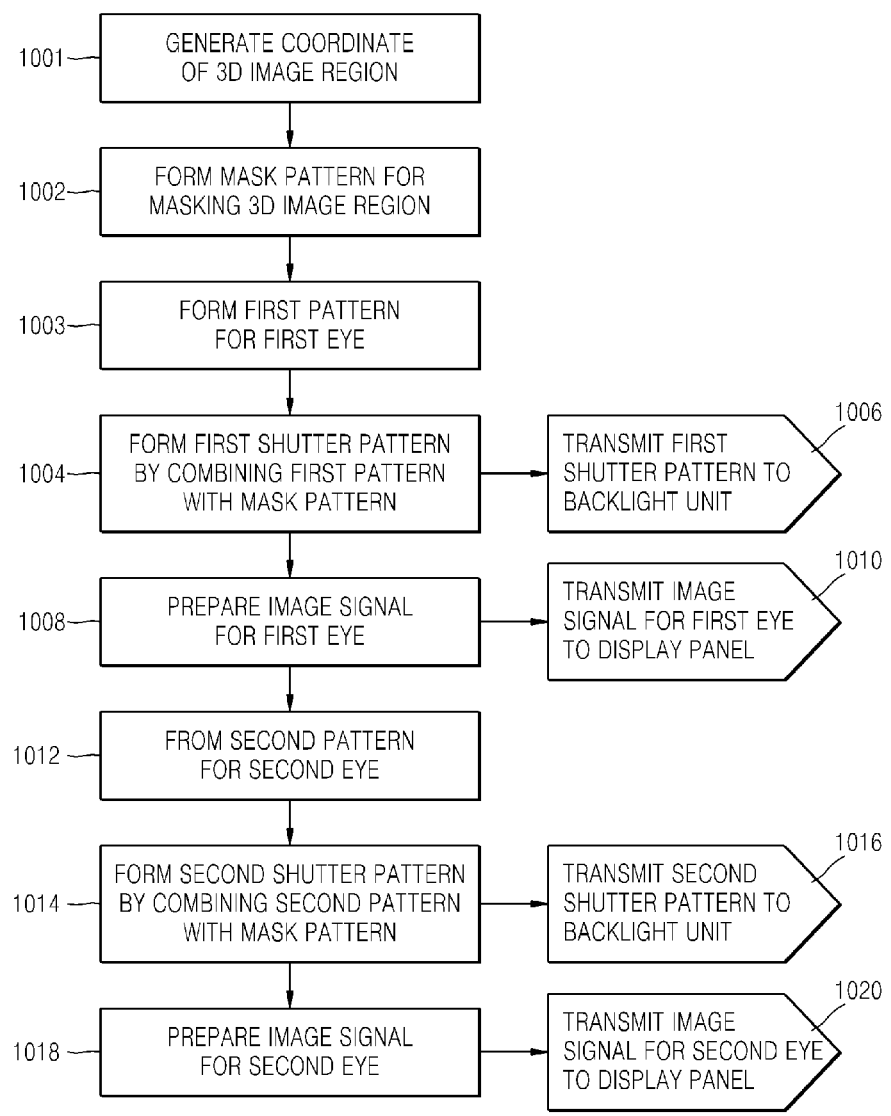
FIG. 3 is a block diagram illustrating an example of a 3D image display method.

FIG. 3 illustrates an example of a 3D image display method. The description below is presented with respect to the 3D image display apparatus illustrated in FIG. 2, but may be applied to other 3D image display apparatuses. Referring to FIG. 3, the input unit 10 generates the coordinates of the 3D image regions (S1), and the mask pattern forming unit 12 forms mask patterns for masking the 3D image regions input from the input unit 10 (S2). The mask patterns may distinguish regions in which the 3D images will be displayed from the regions in which the 2D images will be displayed.

The shutter pattern forming unit 14 may form a first pattern for a first eye, for example, a left eye, by applying the mask patterns (S3). In addition, the first pattern and the mask pattern may be combined to form a first shutter pattern (S4), and the first shutter pattern may be transferred to a backlight unit (S6). An image to be incident at the first eye is prepared (S8), and may be transferred to a display panel (S10). The image to be incident at the first eye may be prepared substantially simultaneously or sequentially with respect to the first shutter pattern.

In a similar manner of forming the first shutter pattern for the first eye, a second shutter pattern for a second eye may be formed. The shutter pattern forming unit 14 may form the second pattern for the second eye, for example, the right eye (S12). In addition, the shutter pattern forming unit 14 may combine the second pattern and the mask pattern to form a second shutter pattern for the right eye (S14), and the second shutter pattern may be transferred to the backlight unit (S16). An image to be incident at the second eye is prepared (S18), and may be transferred to the display panel (S20). The image to be incident at the second eye may be prepared substantially simultaneously or sequentially with respect to the first shutter pattern.

The above processes may be performed by the mask pattern forming unit 12 for forming the mask patterns, by the shutter pattern forming unit 14 for forming the shutter patterns and combining the shutter patterns with the mask patterns, and by a controller 16 for controlling the backlight unit and the display panel. Processes illustrated in FIG. 3 may be implemented by hardware or software.

Figure 4A:
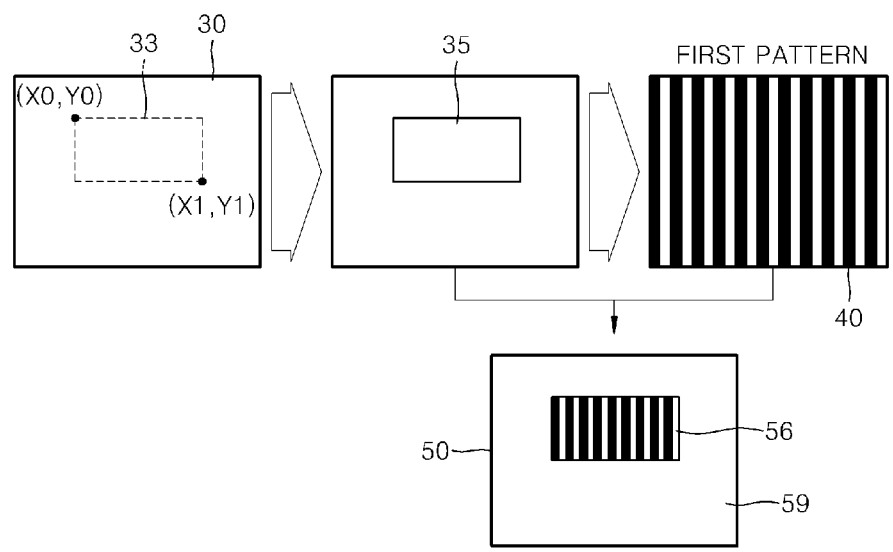
FIGS. 4A and 4B are diagrams illustrating an example of a 3D image display method.
Figure 4B:
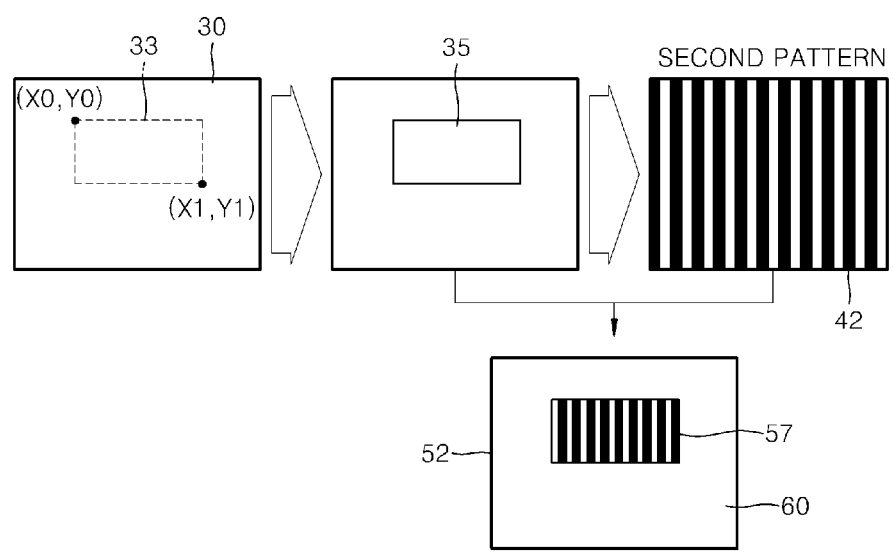

FIGS. 4A and 4B illustrate processes of forming patterns for the left and right eyes. The input unit 10 may generate the coordinates (X0,Y0)(X1,Y1) of a 3D image region 33 displayed on a screen 30 as shown in FIG. 4A. Various methods may be applied to generate the coordinates, for example, coordinates of two points at opposite vertices in the rectangular 3D image region may be formed. The mask pattern forming unit 12 may form the mask pattern 35 corresponding to the 3D image region 33. In addition, the shutter pattern forming unit 14 may form a first pattern 40 for transferring an image to the first eye. The first pattern 40 and the mask pattern 35 may be combined to form a first shutter pattern 50 for the first eye. The first shutter pattern 50 for the first eye may include a first eye pattern 56 of the 3D image region and a pattern 59 of the 2D image region. FIG. 4B shows a process of forming a second shutter pattern 52 for the second eye. For example, the mask pattern 35 that is generated when the first shutter pattern 50 for the first eye is formed may be used again. The shutter pattern forming unit 14 combines a second pattern 42 for transferring an image to the second eye with the mask pattern 35 to form the second shutter pattern 52 for the second eye.

Referring again to FIG. 3, the controller 16 may transmit the first shutter pattern 50 to the backlight unit 17 (S6), prepare an image signal for the first eye (S8), and transmit the image signal for the first eye to a display panel 19 (S10). The controller 16 may also transmit the second shutter pattern 52 to the backlight unit 17 (S16), prepare an image signal for the second eye (S18), and transmit the image signal for the second eye to the display panel 19 (S20).

The backlight unit 17 divides visual fields for the first and second images by adjusting an emitting direction of the light, and thus, the 3D image may be displayed.

Figure 5:
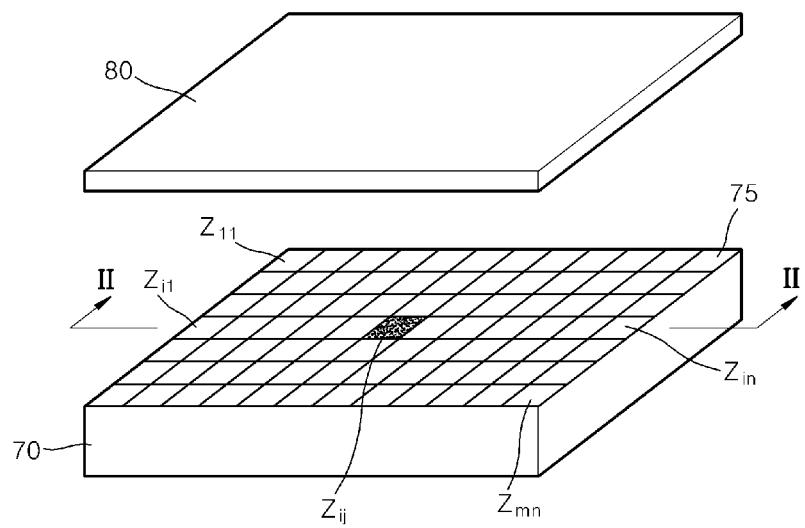
FIGS. 5 and 6 are diagrams illustrating examples of operations of a backlight unit adopted in the 3D image display apparatus.

FIG. 5 illustrates a backlight unit 70 that may be implemented in a 3D image display apparatus. The backlight unit 70 includes a plurality of cells $Z_{11}, \ldots, Z_{mn}$, and each of the cells may include a light emission unit 75 for adjusting an emitting direction of light. As an example, the plurality of the cells $Z_{11}, \ldots, Z_{mn}$ may be arranged in a two-dimensional manner. A display panel 80 may display images according to the light emitted from the backlight unit 70. The display panel 80 includes a plurality of pixels, and each of the pixels may control light transmittance to form the images. As an example, the display panel 80 may be formed as a liquid crystal display (LCD) panel.

Figure 6:
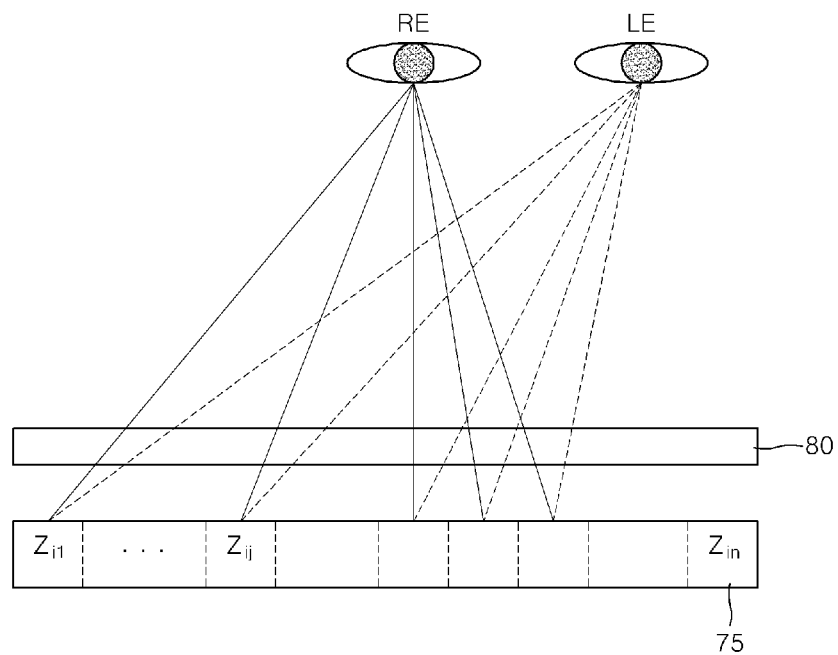

Referring to FIG. 6, the light emission unit 75 may selectively adjust the light emitting direction for each of the cells $Z_{11}, \ldots, Z_{mn}$. Accordingly, the light emitted from each cell can be selectively transmitted the left eye LE, the right eye RE, or both the left and right eyes. When the light is separately transmitted to the left eye LE and the right eye RE, a 3D image may be displayed. Otherwise, when the light is transmitted to both the left and right eyes, a 2D image may be displayed. As described above, the 3D image display apparatus according to certain examples described herein may convert between 2D and 3D displays. In addition, the light emission unit 75 may adjust the light emitting direction in a vertical direction, a horizontal direction, or a diagonal direction of the display apparatus. Thus, the direction of displaying the 3D image may be changed, for example, according to the orientation of the display. As a particular example, the display apparatus may be converted between a landscape type, that is, a transverse viewing mode, and a portrait type, that is, a longitudinal viewing mode.

Since the backlight unit 70 divides the visual fields by adjusting the light emitting direction, thereby displaying the images for the left eye and the right eye time-sequentially, the 3D image may be displayed without a reduction in image resolution.

Figure 7:
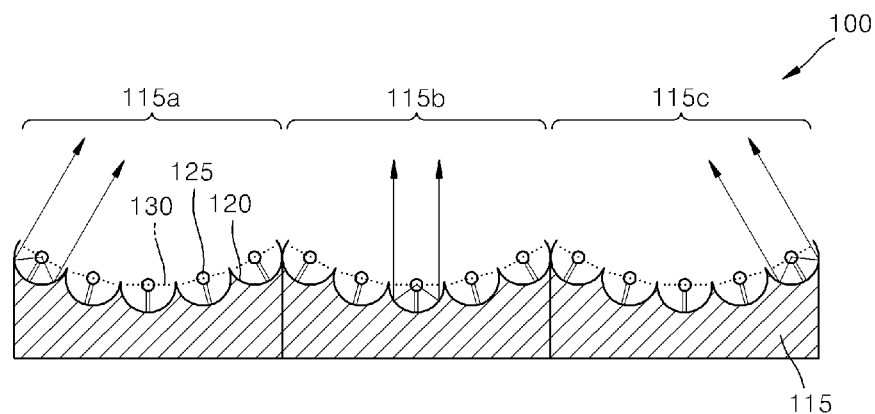
FIGS. 7 through 10 are diagrams illustrating examples of the backlight unit adopted in a 3D image display apparatus.

FIG. 7 illustrates a backlight unit 100 according to another example. The backlight unit 100 includes a plurality of cells, and each of the plurality of cells may include a light emission unit 115 for adjusting a light emitting direction. The plurality of cells may include a first cell 115a, a second cell 115b, and a third cell 115c. However, the cells are not limited thereto. In addition, the plurality of cells may be arranged in a two-dimensional manner, and each cell may be formed to be substantially square and substantially point symmetric. Further, the number of cells or sizes of the cells may vary depending on a size of the display apparatus, the number of pixels, the resolution, and the like.

The light emission unit 115 may include a plurality of reflection units 120 and a plurality of light sources 125. Each light source 125 may be disposed with respect to a corresponding reflection unit 120. Each of the reflection units 120 may have a curved surface, and may be formed of a material that reflects the light emitted from the corresponding light source 125. Each of the plurality of light sources 125 may include a light element, such as a light emitting diode (LED), an organic light emitting diode (OLED), and the like. The reflection units 120 may be arranged in a three-dimensional structure in each of the cells. For example, the reflection portions 120 may be arranged on a curved surface. Accordingly, since the forward directions of the reflection units 120 are different from each other, directions of the light reflected from the reflection units 120 are also different from each other. The reflection units 120 may be arranged in an inversion-symmetric manner.

In each of the cells of the light emission unit 115, the light sources 125 may be selectively turned on or off, in order to adjust the light emitting direction. For example, to achieve a certain light emitting direction, a first light source may be turned on in the first cell 115*a*, a third light source may be turned on in the second cell 115*b*, and a fifth light source may be turned on in the third cell 115*c*. Thus, the light emitting direction from each of the cells may be adjusted independently. The light emitting direction in each of the cells may be determined set to a position of the light source that is turned on, and the controller (for example, controller 16 of FIG. 2) of the 3D image display apparatus may include data regarding relations between the light source and the light emitting direction in each of the cells. The light emitting direction may be controlled in various directions, for example, in the horizontal direction, the vertical direction, and the diagonal direction of the 3D image display apparatus, according to the arrangement of the reflection units 120.

The reflection unit 120 may be formed as a parabolic mirror configured so that the light emitted from the light source 125 is reflected by the reflection unit 120 to be parallel. Accordingly the light source 125 may be located at a focal point of the parabolic mirror. The light source 125 may be installed in the corresponding reflection unit 120, and a virtual line 130 connecting the light sources 125 may be a curved line in the cross-sectional view of the light source 100. As described above, the light emitting direction may be adjusted based on the combination of the locations of the light source 125 and the reflection unit 120. In addition, the 3D image may be displayed by separately transmitting light to the left and right eyes. In addition, the left eye image and the right eye image are displayed in a time-sequential manner so as to display the 3D image without reducing the resolution of the displayed image. That is, the light source 125 that is turned on may be adjusted in each of the cells in the backlight unit 100, so that light is transmitted to the left eye in a first frame, and thus the display panel forms the image for the left eye for the first frame. In addition, in a second frame, the light source 125 that is turned on may be changed in each of the cells so that light is transmitted to the right eye in the second frame, and thus the display panel forms the image for the right eye for the second frame.

On the other hand, the light source located at the same position in each of the cells, for example, the light source located in the center in each of the cells, may be turned on so that light may be transmitted from each of the cells toward the front surface of the display. Accordingly, a 2D image may be displayed. As another example, all of the light sources in each of the cells may be turned on to display a 2D image. As described above, the 2D image and the 3D image may be selectively displayed by adjusting the light emitting direction of each of the cells.

Figure 8:
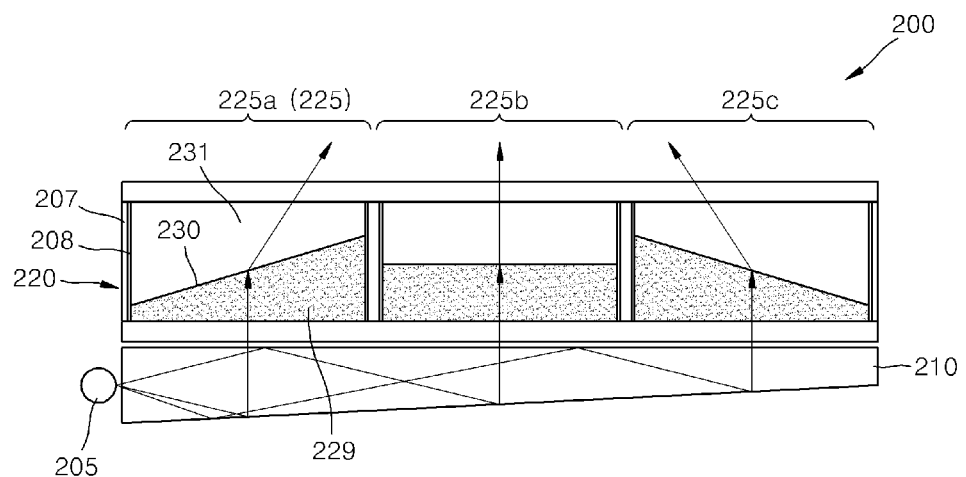

FIG. 8 illustrates a backlight unit 200 according to a further example. The backlight unit 200 includes a light source 205, a light guide plate 210 for guiding the light emitted from the light source 205, and a prism array 220 located on the light guide plate 210 to adjust the light emitting direction. The light source 205 may be a cold cathode fluorescent lamp (CCFL), an LED, an OLED, or the like. The light guide plate 210 guides light emitted from the light source 205 toward the prism array 220. In addition, the light guide plate 210 may collimate light from a point light source or a line light source to provide a surface light source. The light guide plate 210 may be formed as a wedge so as to facilitate collimation of light. Further, although not shown in FIG. 8, a prism light emission pattern may be disposed on an upper surface or a lower surface of the light guide plate so as to facilitate collimation of light. The prism light emission pattern may be formed through one of known technologies in the art, or though a process specially designed for implementing the features described herein.

The prism array 220 is partitioned according to cells 225 on the light guide plate 210. The light emitting direction from each cell may be changed by adjusting an inclination of a refracting surface 230 according to an electric signal. The cells 225 may include a first cell 225*a*, a second cell 225*b*, and a third cell 225*c*. In each of the first, second, and third cells 225*a*, 225*b*, and 225*c*, the inclination of the refracting surface 230 may be independently adjusted in order to control their respective light proceeding directions so that light may be separately transmitted to the left and right eyes. Accordingly, the 3D image may be displayed.

The prism array 220 may include an electrowetting device, for example. The prism array 220 may be partitioned into the cells 225 by electrodes 207, and a polar liquid 229 such as water and non-polar liquid 231 such as oil may be disposed between the electrodes 207. A boundary between the polarizing liquid 229 and the non-polar liquid 231 forms the refracting surface 230. A dielectric layer 208 may be formed on an inner wall of the electrode 207, and the dielectric layer 208 has a hydrophobic surface. The dielectric layer 208 may be formed by coating an upper surface of the dielectric layer with a hydrophobic thin film or by using a hydrophobic dielectric layer. When a voltage is not applied to the electrode, the polar liquid 229 may be inclined at a high contact angle with respect to the dielectric layer 208. When a voltage is applied to the electrode 207, the contact angle between the dielectric layer 208 and the polarizing liquid 229 may be reduced, thereby changing the inclination of the refracting surface 230. When the inclination of the refracting surface 230 is changed, the light emitting direction also changes. As described above, the light emitting direction may be adjusted by controlling on/off switching of the voltage applied to the electrode 207, or by adjusting the magnitude of voltage. Although the above example of the prism array 220 adjusts the light emitting direction by using electrowetting, the light emitting direction may be adjusted by other methods. For example, if the image is formed by polarized light, the light emitting direction may be adjusted by using liquid crystal. In this case, an arrangement of liquid crystal molecules is changed according to a magnitude of an electric field formed by the voltage applied to the electrode, thereby changing the refractive power of liquid crystal.

In the backlight unit 200 of FIG. 8, the light emitting direction may be adjusted according to the magnitude and direction of voltage applied to the prism array 220. For example, at a first time point t1, the light may be transmitted to the left eye, and at a second time point t2, the light may be transmitted to the right eye, so that a 3D image may be displayed. As described above, since the left eye image and the right eye image are displayed in the time-sequential manner, a 3D image may be displayed without a reduction in image resolution. Further, a 2D image may be displayed by adjusting the light to be emitted from each of the cells in substantially the same direction. Thus, both a 2D image display and a 3D image display may be provided by backlight 200.

Figure 9:
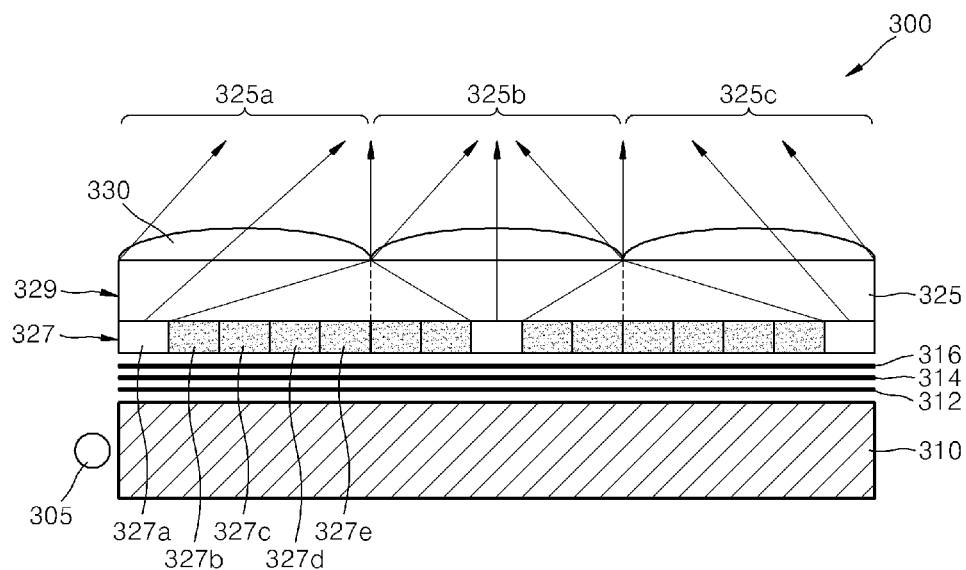

FIG. 9 illustrates a backlight unit 300 according to yet another example. The backlight unit 300 includes a plurality of cells, and each of the cells includes a light emission unit 325 for adjusting a light emitting direction. The light emission unit 325 may include a light array for selectively transmitting light, and a direction adjustor for controlling the direction of light emitted from the light array. The light array may include a light source 305, a light guide plate 310 for guiding the light emitted from the light source 305, and a shutter array 327 disposed on the light guide plate 310. A lens array 330 may be disposed on the shutter array 327. The lens array 330 may function as the direction adjustor for controlling the direction of light emitted from the shutter array 327.

The light source 305 may be a CCFL, an LED, an OLED, or the like. In addition, the light guide plate 310 may include scattering type light emission patterns.

The shutter array 327 may include a plurality of shutters for each of the cells, and the plurality of shutters may be arranged in a two-dimensional manner. For example, the shutter array 327 may include first through fifth shutters 327a, 327b, 327c, 327d, and 327e in the first cell 325a. The first through fifth shutters 327a, 327b, 327c, 327d, and 327e may be formed as a liquid crystal shutter, an electrowetting shutter, a frustrated total internal reflection (FTIR) shutter, or the like. The FTIR shutter may be employed to reduce power consumption, as compared to other shutters, since the FTIR shutter uses recycled light.

The lens array 330 includes a lens in each of the cells, and the shutter array 327 may be disposed on a focusing surface of the lens array 330. For example, when the cells are arranged in a two-dimensional manner, the lens array 330 may be also arranged in a two-dimensional manner. A space layer 329 may be further disposed between the lens array 330 and the shutter array 327 in order to provide a desired distance for the focal distance. The space layer 329 may be formed of a material having the same or similar refractive index as that of the lens array 330, or may be formed integrally with the lens array 330. A diffusion plate 312 for evenly diffusing the light emitted from the light guide plate 310, a prism sheet 314 for correcting the light proceeding path, and a brightness improving film 316 may each be further disposed between the shutter array 327 and the light guide plate 310.

The light emitted from the light source 305 is spread to substantially the entire surface of the backlight unit 300 through the light guide plate 310, and thus, the light source 305 is converted into the surface light source. The light emitted from the light guide plate 310 to the upper portion of the light guide plate 310 may be turned on/off according to opening/closing operations of the shutter array 327, and the proceeding direction of the light may be changed according to cooperation of the open shutter location and the lens array 330. For example, when the first shutter 327a is opened in a first cell 325a and the other shutters are closed, the light may proceed toward an upper right portion in FIG. 9. When the third shutter 327c is opened in a second cell 325b and the other shutters are closed, the light may proceed toward a front portion in FIG. 9. In addition, when the fifth shutter 327e is opened in a third cell 325c and the other shutters are closed, the light may proceed toward an upper left portion in FIG. 9. As described above, when the light emitting direction is adjusted in each of the cells, the visual fields of the left eye and the right eye may be divided to display the 3D image. The light emitting direction may be variously adjusted according to a combination of the location of an open shutter and a corresponding lens. When the shutter array is arranged in a two-dimensional manner, the light emitting direction may be freely adjusted in substantially all directions. Therefore, the display direction may be converted freely, and thus, the 3D image display apparatus may display 3D images in various orientations, such as a portrait type and a landscape type.

On the other hand, a 2D image may be displayed by controlling the locations of the shutters in the shutter array 327. For example, when all of the shutters in the shutter array 327 are opened, or when one or more shutters located at the same location in each of the cells are opened, a 2D image may be displayed. As described above, both a 2D image display and a 3D image display may be provided by adjusting the locations of the open shutters. In addition, the left eye image and the right eye image may be displayed in a time-sequential manner, and thus, a 3D image may be displayed without a reduction in image resolution.

Figure 10:
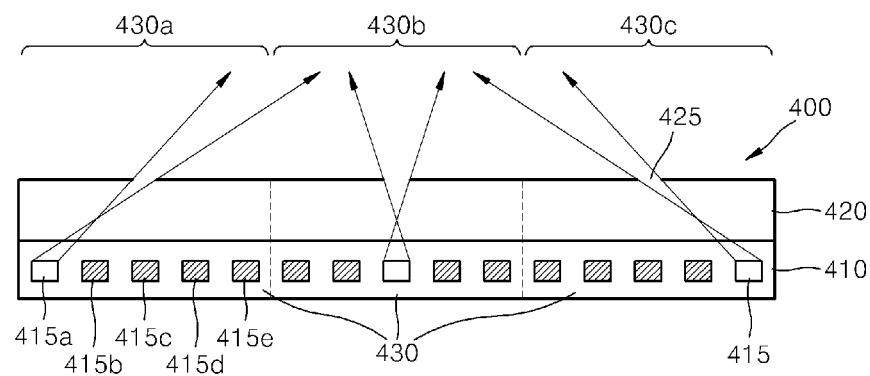

FIG. 10 shows a backlight unit 400 according to still another example. The backlight unit 400 is partitioned into a plurality of cells 430, and each of the cells 430 includes a light emission unit 420 for adjusting a light emitting direction. The light emission unit 420 includes a light source array 415, in which a plurality of light sources are arranged, and a pin hole 425 disposed on an upper portion of the light source array 415. The light source array 415 may include an LED, an OLED, or the like. One pin hole 425 may be formed in each of the cells 430. In FIG. 10, the light source array 415 may turn on/turn off each of the light sources. When compared with the backlight unit 300 of FIG. 9, the light source 305, the light guide plate 310, and the shutter array 327 may be replaced by the light source array 415 of FIG. 10, and the light source array 415 provides for the functions of the light array. The light source array 415 may be arranged in a two-dimensional manner, and each cell may be formed to be substantially square and substantially point symmetric. For example, the light source array 415 may include first through fifth light sources 415a, 415b, 415c, 415d, and 415e in a first cell 430a. The direction of emitted light may be limited by the coordination of the light source that is turned on from among the light sources in the light source array 415, and the pin hole 425 corresponding to the turned on light source.

For example, the plurality of cells 430 may include the first cell 430a, a second cell 430b, and a third cell 430c. In the first cell 430a, when the first light source 415a is turned on and the other light sources are turned off, the light emitted from the first light source 415a is directed toward an upper right portion in FIG. 10 through the pin hole 425. In the second cell 430b, when the third light source 415c is turned on and the other light sources are turned off, the light emitted from the third light source 415c is directed toward an upper middle portion through the pin hole 425. In the third cell 430c, when the fifth light source 415e is turned on and the other light sources are turned off, the light may is directed toward an upper left portion of FIG. 10 through the pin hole 425. FIG. 10 shows the light beams proceeding in different directions in order to illustrate that the light emitting direction may be adjusted independently in each of the cells 430. For example, the light may be separately transmitted to the left eye or the right eye according to the light emitting direction that is adjusted by the combination of the location of the light source that is turned on in each of the cells 430 and the pin hole 425. That is, the light may be transmitted in a desired direction according to a relative location of the pin hole with respect to the light source that is turned on. Accordingly, a 3D image may be displayed. As one example, two or more light sources in the light source array 415 may be turned on simultaneously in each of the cells 430.

On the other hand, if one or more light sources located at the same location in each of the cells 430 are turned on, a 2D image may be displayed. As described above, according to the backlight unit 400, a 3D image display may be converted to a 2D image display simply by adjusting the location of the light source that is turned on in the light source array 415. In addition, when displaying the 3D images, an entire region of the display panel is used to display the left eye image and the right eye image, and thus, the 3D image may be displayed without a reduction in image resolution.

Furthermore, a 3D image display apparatus according to examples described herein may display images of two views by increasing a refresh rate. A screen in one period may be referred to as a frame, and a scanning speed corresponding to the image of each point of view included in one frame may be referred to as the refresh rate. For example, when a frequency of one frame is 60 Hz, in order to realize four views in one frame, the refresh rate should be 240 Hz or greater. As described above, the refresh rate may be adjusted, and the light emission unit may emit light after adjusting the light emitting direction to correspond to each of the views at a rate corresponding to the refresh rate. Thus, a 3D image of four views may be displayed. Here, the 3D image of four views is described as an example, and a 3D image of four or more views may be displayed.

As described above, a 3D image or a 2D image may be selectively provided by adjusting the light emitting direction in the light emission unit of the backlight unit. Both a 2D image display and a 3D image display may be selectively provided by adjusting the light emitting unit in each of the cells. Further a 2D image display and a 3D image display may be substantially simultaneously displayed on one screen.

The shutter pattern forming unit 14 described with reference to FIG. 2 may form shutter patterns corresponding to a 2D image region and a 3D image region in a single screen, and the controller 16 may control the light emission unit in each of the cells of the backlight unit 17 according to the shutter patterns.

Figure 11A:
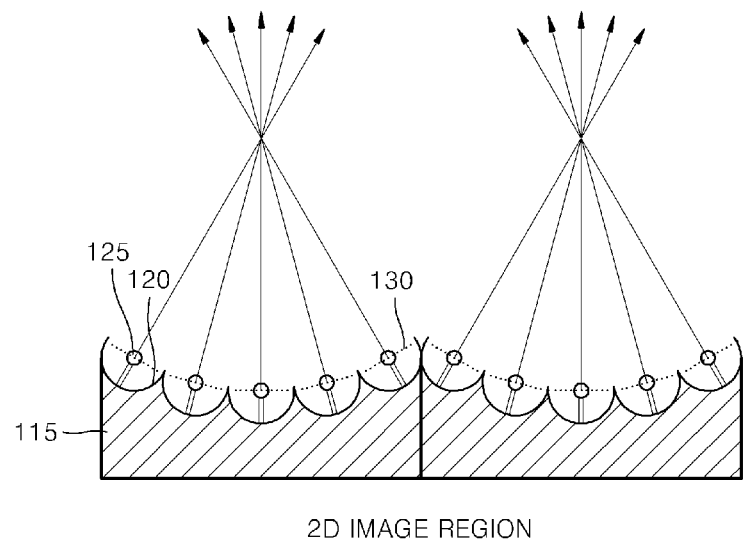
FIGS. 11A and 11B are diagrams illustrating examples of displaying a 2D image and a 3D image according to the backlight unit of FIG. 7.
Figure 11A:
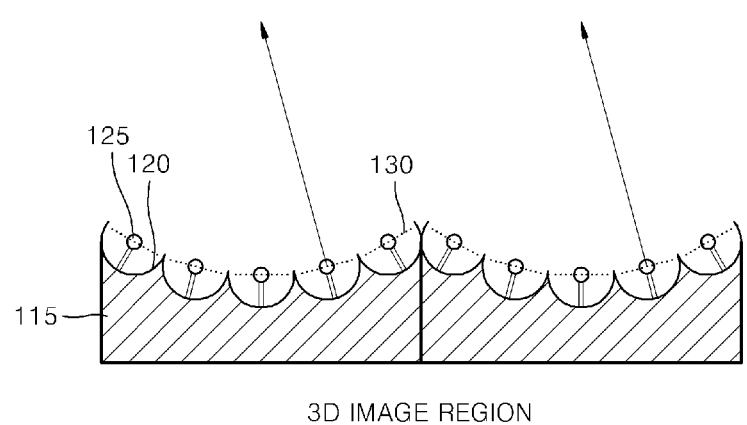
Figure 11B:
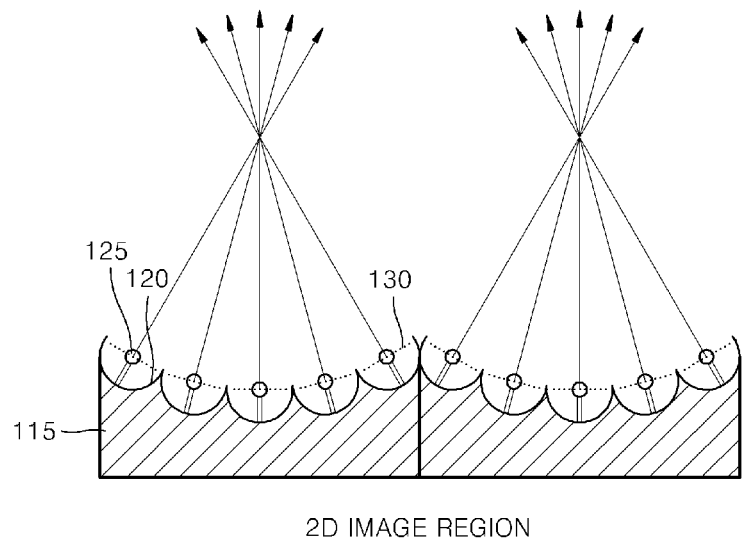
Figure 11B:
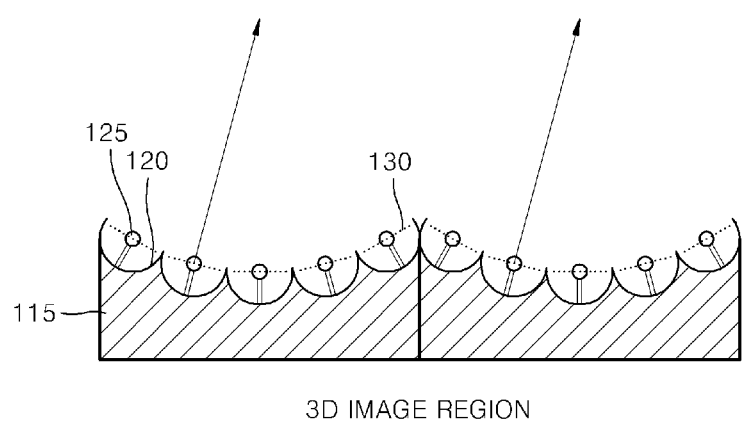

FIGS. 11A and 11B illustrate examples of operations of displaying a 2D image and a 3D image by adjusting the backlight unit 100 illustrated in FIG. 7. For example, FIG. 11A shows a first shutter pattern, and FIG. 11B shows a second shutter pattern.

Referring to FIG. 11A, each of the light sources in each cell of the light emission unit 115 are turned on with respect to a 2D image region of the first shutter pattern. In addition, with respect to a 3D image region of the first shutter pattern, only a certain light source (as illustrated, the fourth light source) in each of the cells may be turned on and the other light sources may be turned off so that light may be emitted in a first direction (for example, to a viewer's left eye) from the light emission unit 115 in each of the cells 115.

Referring to FIG. 11B, each of the light sources in each of cell of the light emission unit 115 may be turned on with respect to the 2D image region of the second shutter pattern. In addition, with respect to a 3D image region of the second shutter pattern, only a certain light source (as illustrated, the second light source) in each of the cells may be turned on and the other light sources may be turned off so that light may be emitted in a second direction (for example, to a viewer's right eye) from the light emission unit 115 in each of the cells. However, the examples described herein not limited to the particular implementation illustrated in FIGS. 11A and 11B. As another example, instead of turning on the second light source in the cells of the 3D image region, the location of the light source that is turned on may vary in each of the cells according to the locations of the cells in the 3D image region.

Figure 12A:
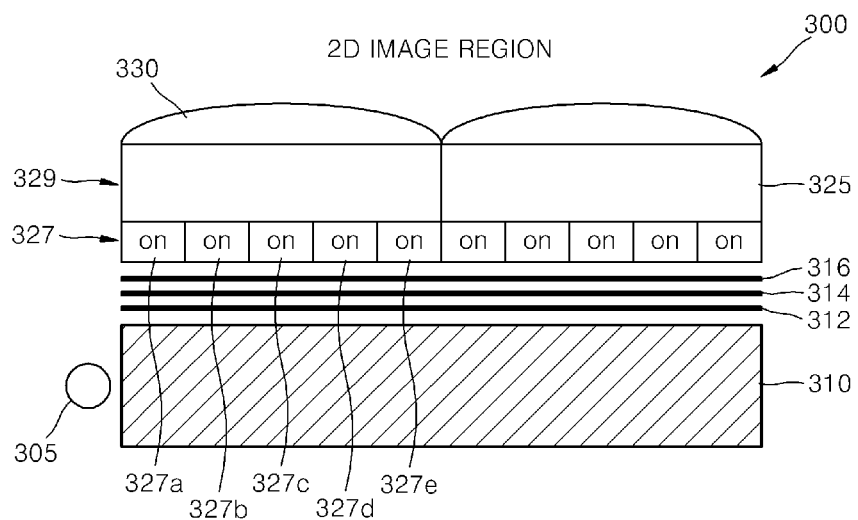
FIGS. 12A and 12B are diagrams illustrating examples of displaying a 2D image and a 3D image according to the backlight unit of FIG. 9.
Figure 12A:
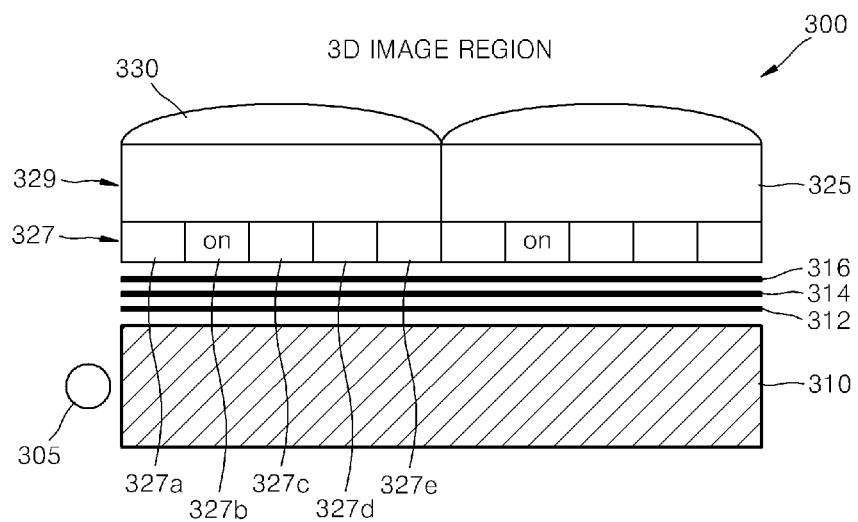
Figure 12B:
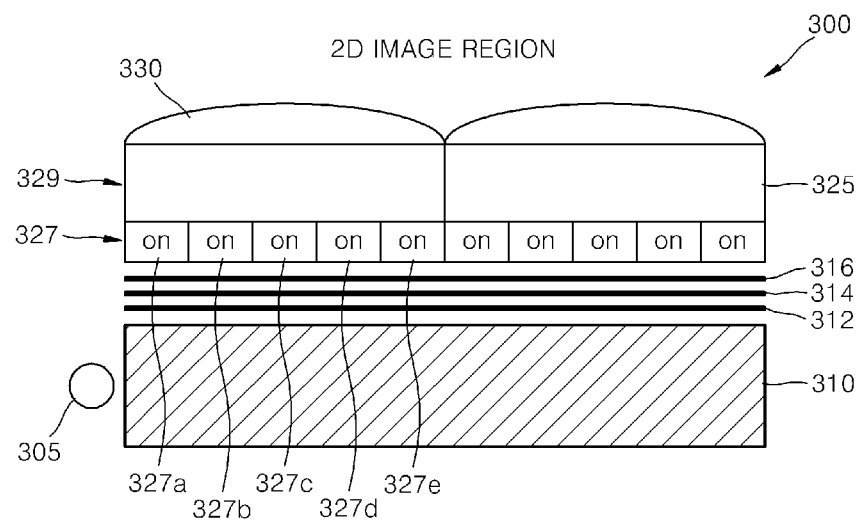
Figure 12B:
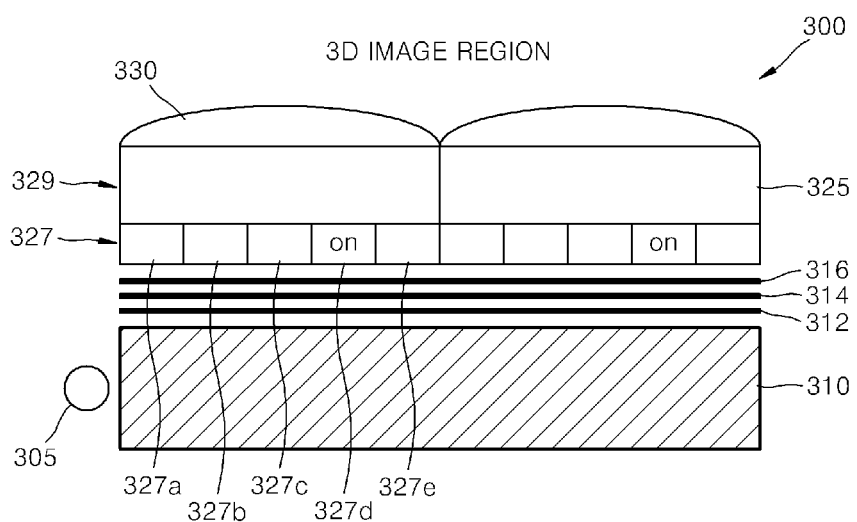

FIGS. 12A and 12B illustrate examples of operations of displaying 2D and 3D images by adjusting the backlight unit 300 of FIG. 9. For example, FIG. 12A shows a first shutter pattern, and FIG. 12B shows a second shutter pattern.

Referring to FIG. 12A, with respect to a 2D image region of the first shutter pattern, all shutters in the light emission unit 325 in each of the cells may be turned on. In addition, with respect to a 3D image region of the first shutter pattern, only a certain shutter (as illustrated, the second shutter 327b) in each of the cells may be turned on and the other shutters are turned off so that light is emitted in a first direction (for example, to a viewer's left eye) from the light emission unit 325 in each of the cells. Here, turning-on of the shutter indicates opening the shutter, and turning-off of the shutter indicates closing the shutter.

Referring to FIG. 12B, with respect to a 2D image region of the second shutter pattern, all shutters of the light emission unit 325 in each of the cells may be turned on. In addition, with respect to a 3D image region of the second shutter pattern, only a certain shutter (as illustrates, the fourth shutter 327d) in each of the cells may be turned on and the other shutters may be turned off so that light is emitted in a first direction (for example, to a viewer's right eye) from the light emission unit 325 in each of the cells.

Figure 13A:
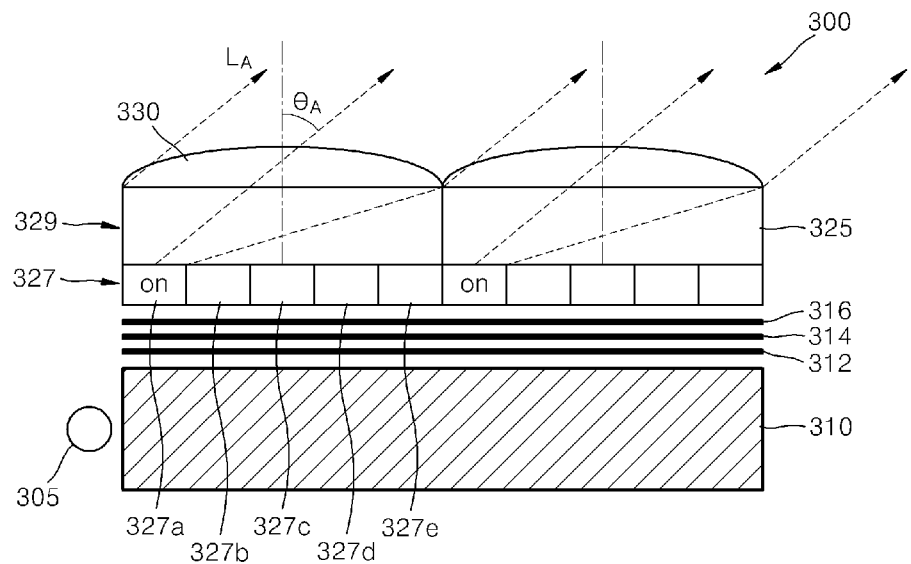
FIGS. 13A and 13B are diagrams illustrating an example of a method of adjusting a light emitting angle from the backlight unit of FIG. 9.
Figure 13B:
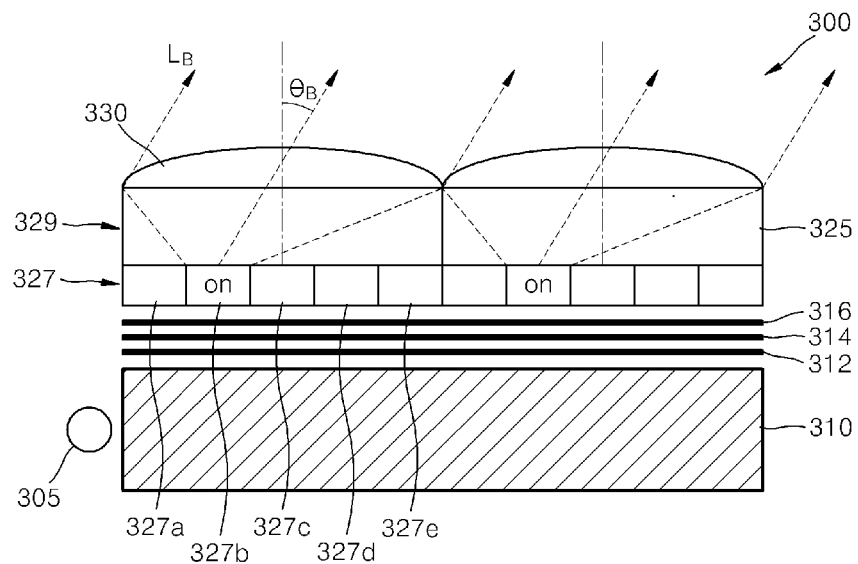

On the other hand, FIGS. 13A and 13B illustrate examples where the light emitting direction varies depending on the location of the shutter that is turned on in each of the cells of the backlight unit 300 of FIG. 9. For example, as shown in FIG. 13A, when the first shutter 327a is turned on, a first emitting angle of a first light $L_A$ that has passed through the first shutter 327a is $\theta_A$. In addition, as shown in FIG. 13B, when the second shutter 327b is turned on, a second emitting angle of a second light $L_B$ that is emitted from the second shutter 327b is $\theta_B$.

Figure 14:
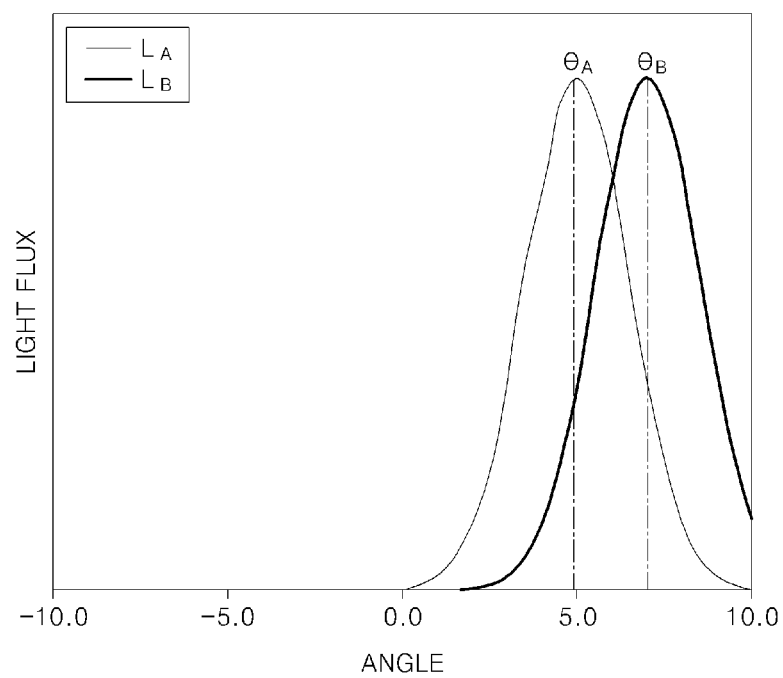
FIG. 14 is a graph illustrating an example of a flux according to an emitting angle of the light emitted from the backlight unit shown in FIGS. 13A and 13B.

FIG. 14 illustrates a graph showing an example of flux according to the emitting angle. As described above, the light emitting angle may be discretely adjusted to be $\theta_A$ and $\theta_B$ according to the on/off signals of the light emission unit. As the interval between the emitting angles is reduced, a range of selecting the screen size or the viewing distance may be increased. In order to reduce the interval between the emitting angles, the number of shutters and pitches between the shutters in each of the cells may be adjusted. Herein, the pitch between shutters may indicate a spacing between neighboring shutters. As one example, the interval between the emitting angles may be adjusted in an implementation where each of the cells includes the same number of shutters. For example, in order to obtain a third emitting angle $\theta_C$ ($\theta_A < \theta_C < \theta_B$) between the first emitting angle of the first light $L_A$ and the second emitting angle of the second light a light transmittance of each of the shutters in the light emission unit may be adjusted.

Figure 15:
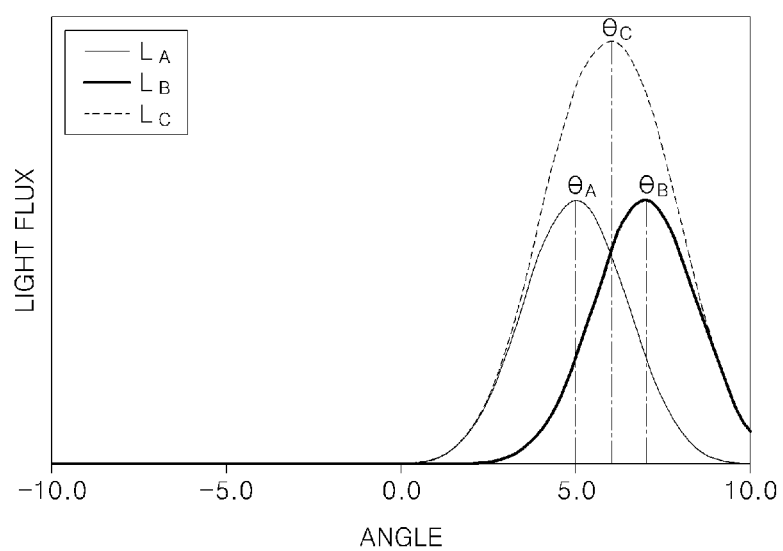
FIG. 15 is a graph illustrating an example of a method of adjusting the light emitting angle by combining lights emitted at different emitting angles.

FIG. 15 illustrates an example where the light is emitted at the third emitting angle $\theta_C$ by combining the first light $L_A$ of the first emitting angle $\theta_A$ and the second light $L_B$ of the second emitting angle $\theta_B$. The third emitting angle $\theta_C$ may be obtained by adjusting the light transmittances of the first shutter 327a emitting the first light $L_A$ and the second shutter 327b emitting the second light $L_B$. Accordingly, $\theta_C$ may be calculated according to Equation 1.

$$\theta_C = (\alpha \theta_A + \beta \theta_B)/2 \quad \text{(Equation 1)}$$

Here, α denotes the light transmittance of the first shutter 327a and β denotes a function determined according to the light transmittance of the second shutter 327b. The light transmittance of the shutter may be adjusted by controlling at least one of polarization, the transmitting area per unit area of the shutter, the transmitting time per unit time, and the like. As described above, as the interval between the emitting angles is reduced, the selection range of the screen size or the viewing distance may be increased.

As described above, in the described examples of a 3D image display apparatus, a 2D image and a 3D image may be simultaneously displayed on one screen, and thus, 2D and 3D images may be efficiently displayed in window type interfaces.

The units described herein may be implemented using hardware components and software components. For example, input units, mask pattern forming units, shutter pattern forming units, and controllers. A controller may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) image display apparatus comprising:
    an input unit configured to generate a 3D image region displaying a 3D image and a two-dimensional (2D) image region displaying a 2D image, wherein the 3D image is independent from the 2D image;
    a mask pattern forming unit configured to form a mask pattern corresponding to the 3D image region;
    a shutter pattern forming unit configured to form a first shutter pattern for a first eye and a second shutter pattern for a second eye, according to the mask pattern;
    a backlight unit comprising a plurality of cells and a light emission unit configured to adjust a light proceeding direction in each of the plurality of cells;
    a controller configured to adjust the proceeding direction of the light emitted from the light emission unit according to the first and second shutter patterns; and
    a display panel to display images according to the light emitted from the backlight unit, wherein
    the 2D image and the 3D image are simultaneously displayed on one screen and the 3D image region is distinguished from the 2D image region by the mask patterns.

2. The 3D image display apparatus of claim 1, wherein the input unit comprises a coordinate generator for generating coordinates of the 3D image region.

3. The 3D image display apparatus of claim 1, wherein the light emission unit comprises:
    a plurality of reflection units arranged in a two-dimensional manner along a curved surface, each of the plurality of reflection units having a curved portion; and
    a plurality of light sources, each of the plurality of light sources corresponding to one of the plurality of reflection units.

4. The 3D image display apparatus of claim 3, wherein each of the plurality of reflection units reflects the light emitted from each of the plurality of corresponding light sources as collimated light.

5. The 3D image display apparatus of claim 3, wherein each of the plurality of light sources is independently controlled.

6. The 3D image display apparatus of claim 1, wherein the light emission unit comprises:
    a plurality of light sources;
    a light guide plate to guide light emitted from the plurality of light sources; and
    a prism array disposed on the light guide plate to adjust an inclination of a refracting surface according to an electric signal, wherein the prism array is partitioned with respect to the plurality of cells.

7. The 3D image display apparatus of claim 6, wherein the light guide plate is formed as a wedge.

8. The 3D image display apparatus of claim 6, wherein the prism array comprises an electrowetting device.

9. The 3D image display apparatus of claim 6, wherein the prism array is arranged in a two-dimensional manner.

10. The 3D image display apparatus of claim 1, wherein the light emission unit comprises:
    a light array to selectively switch a light source; and
    a direction adjustor to limit a proceeding direction of light emitted from the light array.

11. The 3D image display apparatus of claim 1, wherein the light emission unit comprises:
    a plurality of light sources;
    a light guide plate to guide light emitted from the plurality of light sources;
    a shutter array disposed on the light guide plate, comprising a plurality of shutters, each of the plurality of shutters independently controllable to open and close; and
    a lens array disposed on the shutter array.

12. The 3D image display apparatus of claim 11, wherein the shutter array comprises at least one selected from the group of a liquid crystal shutter, an electrowetting shutter, a frustrated total internal reflection (FTIR) shutter, and any combination thereof.

13. The 3D image display apparatus of claim 11, wherein the shutter array is arranged in a two-dimensional manner.

14. The 3D image display apparatus of claim 11, wherein a light emitting angle is adjusted by adjusting light transmittances of the plurality of shutters in each of the cells.

15. The 3D image display apparatus of claim 14, wherein the light transmittances of the plurality of shutters are adjusted by controlling at least one selected from the group of polarization, a transmitting area per unit area of the shutter, a transmitting time per unit time, and any combination thereof.

16. The 3D image display apparatus of claim 1, wherein the light emission unit comprises:
    a light source array disposed on each of the cells, comprising a plurality of light sources that are independently controllable to turn on and turn off; and
    a pin hole array disposed on each of the cells to limit a proceeding direction of light emitted from each of the plurality of light sources.

17. The 3D image display apparatus of claim 1, wherein the first shutter pattern comprises a pattern for a 2D image and a pattern for a left eye image, and the second shutter pattern comprises a pattern for a 2D image and a pattern for a right eye image.

18. A 3D image display method comprising:
    generating a 2D image region displaying a 2D image and a 3D image region displaying a 3D image by an input unit, wherein the 3D image is independent from the 2D image;
    forming a mask pattern corresponding to the 3D image region by a mask pattern forming unit;
    forming a first shutter pattern for a first eye according to the mask pattern by a shutter pattern forming unit;
    forming a second shutter pattern for a second eye according to the mask pattern by the shutter pattern forming unit;
    adjusting a light proceeding direction from each of a plurality of cells of a backlight unit, according to the first shutter pattern and the second shutter pattern; and
    emitting light in the adjusted light proceeding direction of each of the plurality of cells, wherein
    the 2D image and the 3D image are simultaneously displayed on one screen and the 3D image region is distinguished from the 2D image region by the mask patterns.

19. The 3D image display method of claim 18, wherein the first shutter pattern comprises a pattern for a 2D image and a pattern for a left eye image, and the second shutter pattern comprises a pattern for a 2D image and a pattern for a right eye image.

20. The 3D image display method of claim 18, wherein the backlight unit comprises the plurality of cells and a light emission unit, and the light emission unit comprises:
    a plurality of light sources;
    a light guide plate to guide light emitted from the plurality of light sources;
    a shutter array disposed on the light guide plate, comprising a plurality of shutters, each of the plurality of shutters independently controllable to open and close; and
    a lens array disposed on the shutter array.

21. The 3D image display method of claim 20, wherein the shutter array comprises at least one selected from the group of a liquid crystal shutter, an electrowetting shutter, a frustrated total internal reflection (FTIR) shutter, and any combination thereof.

22. The 3D image display method of claim 20, wherein a light emitting angle is adjusted by adjusting light transmittances of the plurality of shutters in each of the cells.

23. The 3D image display method of claim 22, wherein the light transmittances of the plurality of shutters are adjusted by controlling at least one selected from the group of polarization, a transmitting area per unit area of the shutter, transmitting time per unit time, and any combination thereof.

24. A method of displaying images on a screen, the method comprising:
    receiving 2D image information and 3D image information from an input unit;
    determining a 2D image region of the screen according to the 2D image information;
    determining a 3D image region of the screen according to the 3D image information;
    forming a mask pattern according to the 3D image region by a mask pattern forming unit;
    generating a first shutter pattern for a first eye according to the mask pattern by a shutter pattern forming unit;
    generating a second shutter pattern for a second eye according to the mask pattern by the shutter pattern forming unit;
    displaying a 2D image in the 2D image region of the screen, according to the 2D image information and the first and second shutter patterns; and
    displaying a 3D image in the 3D image region of the screen, according to the 3D image information and the first and second shutter patterns, wherein
    the 2D image and the 3D image are simultaneously displayed on one screen and the 3D image is independent from the 2D image.

25. The method of displaying images of claim 24, wherein the first shutter pattern comprises a pattern for the 2D image and a pattern for a left eye image of the 3D image, and the second shutter pattern comprises a pattern for the 2D image and a pattern for a right eye image of the 3D image.

26. The method of displaying images of claim 24, wherein the determining of the 3D image region comprises generating coordinates of the 3D image region.

27. The 3D image display apparatus of claim 14, wherein when a first shutter is opened in a first cell and other shutters are closed, the light emitting angle proceeds towards an upper right direction, and when a third shutter is opened in a second cell and the other shutters are closed, the light emitting angle proceeds towards a front direction, and when a fifth shutter is opened in a third cell and the other shutters are closed, the light emitting angle proceeds towards an upper left direction.

* * * * *